United States Patent [19]

Ooyama et al.

[11] Patent Number: 4,711,201

[45] Date of Patent: Dec. 8, 1987

[54] TWO-CYCLE ENGINE

[75] Inventors: Kazuo Ooyama, Niiza; Kenji Ooki, Asaka; Toshio Mizushima, Wako, all of Japan

[73] Assignee: Honda Giken Kogyo Kabushiki Kaisha, Japan

[21] Appl. No.: 828,856

[22] Filed: Feb. 12, 1986

[30] Foreign Application Priority Data

Feb. 15, 1985 [JP] Japan .................................. 60-27952
Feb. 15, 1985 [JP] Japan .................................. 60-27954

[51] Int. Cl.[4] ................................................ F16J 1/14
[52] U.S. Cl. ............................ 123/73 A; 123/197 A; 123/193 P; 92/191
[58] Field of Search ............. 123/73 A, 193 P, 197 A, 123/41.35, 41.38, 73 R; 92/179, 187, 191; 403/150

[56] References Cited

U.S. PATENT DOCUMENTS

| | | | |
|---|---|---|---|
| 2,189,357 | 2/1940 | Cull | 123/73 A |
| 3,555,972 | 1/1971 | Hulsing | 123/193 P |
| 4,013,057 | 3/1977 | Guenther | 123/193 P |
| 4,576,126 | 3/1986 | Ancheta | 123/193 P |

FOREIGN PATENT DOCUMENTS

| | | | |
|---|---|---|---|
| 22561 | of 1912 | United Kingdom | 123/193 P |
| 0898108 | 1/1982 | U.S.S.R. | 123/193 P |
| 1011880 | 4/1984 | U.S.S.R. | 123/193 P |
| 1182188 | 9/1985 | U.S.S.R. | 123/193 P |

Primary Examiner—Craig R. Feinberg
Assistant Examiner—David A. Okonsky
Attorney, Agent, or Firm—Darby & Darby

[57] ABSTRACT

A two-cycle engine includes an engine body having at least one cylinder, the cylinder having an exhaust port and at least one scavenge port disposed generally in opposed relation to the exhaust port. A piston is received in the cylinder for reciprocal movement therealong and having an outer peripheral surface for closing the exhaust and scavenge ports during the reciprocal movement thereof. The piston has a transverse bore extending therethrough with opposite ends of the transverse bore opening to the outer peripheral surface of the piston. The opposite ends of the transverse bore is capable of being brought into facing relation to the opposed exhaust and scavenge ports, respectively, during the reciprocal movement of the piston. A hollow wrist pin is received in the transverse bore and retained therein, one end of the wrist pin being closed.

9 Claims, 8 Drawing Figures

TWO-CYCLE ENGINE

BACKGROUND OF THE INVENTION

1. Field of the Invention

This invention relates to two-cycle engines in which a hollow wrist pin received in a piston and connecting a connecting rod to the piston is so arranged that during the movement of the piston, an axis of the wrist pin is movable into a plane passing exhaust and scavenge ports.

2. Prior Art

Utility Model Publication No. 50-20193 discloses one example of conventional two-cycle engines in which axes of exhaust and scavenge ports in a wall of a cylinder are disposed transversely of a hollow wrist pin which connects one end of a connecting rod to a piston movable along the cylinder. From the viewpoint of design, there are occasions when exhaust and scavenge ports need to be positioned in opposed relation to each other in such a manner that opposite ends of the hollow wrist pin, received in a transverse hole through the piston, is brought into registry with the opposed exhaust and scavenge ports during the movement of the piston along the cylinder. Therefore, the opposed exhaust and scavenge ports are brought into communication with each other via an axial bore of the hollow wrist pin during the operation of the engine. As a result, a fuel-air mixture in a crankcase is caused to be fed directly to the exhaust port through the scavenge port and the hollow wrist pin on the downward stroke of the piston to by-pass the combustion chamber. In addition, since the exhaust port is brought into communication with the interior of the crankcase, the exhaust gas is caused to flow thereinto, so that a residual pressure wave of the exhaust gas in an exhaust pipe is attenuated. The residual pressure wave or reflected pressure wave serves to force a blowby gas, tending to flow from the combustion chamber, back thereinto to achieve a good charging efficiency. Further, the flowing of the exhaust gas into the crankcase will dilute the fuel-air mixture.

SUMMARY OF THE INVENTION

It is therefore an object of this invention to provide a two-cycle engine of the type in which opposed exhaust and scavenge ports are not brought into communication with each other via a hollow wrist pin during the running of the engine even if the opposite ends of the wrist pin is brought into registry with the opposed exhaust and scavenge ports.

According to the present invention, there is provided a two-cycle engine comprising:

(a) an engine body having at least one cylinder, said cylinder having an exhaust port and at least one scavenge port disposed generally in opposed relation to said exhaust port;

(b) a crankshaft rotatably mounted on said engine body;

(c) a piston received in said cylinder for reciprocal movement therealong and having an outer peripheral surface for closing said exhaust and scavenge ports during the reciprocal movement thereof, said piston having a transverse bore extending therethrough with opposite ends of said transverse bore opening to the outer peripheral surface of said piston, and the opposite ends of said transverse bore being capable of being brought into facing relation to said opposed exhaust and scavenge ports, respectively, during the reciprocal movement of said piston;

(d) a hollow wrist pin received in said transverse bore and retained therein, one end of said wrist pin being closed; and (e) a connecting rod connected between said crankshaft and said wrist pin for moving said piston along said cylinder upon rotation of said crankshaft.

DESCRIPTION OF PREFERRED EMBODIMENTS OF THE INVENTION

Figure 1:
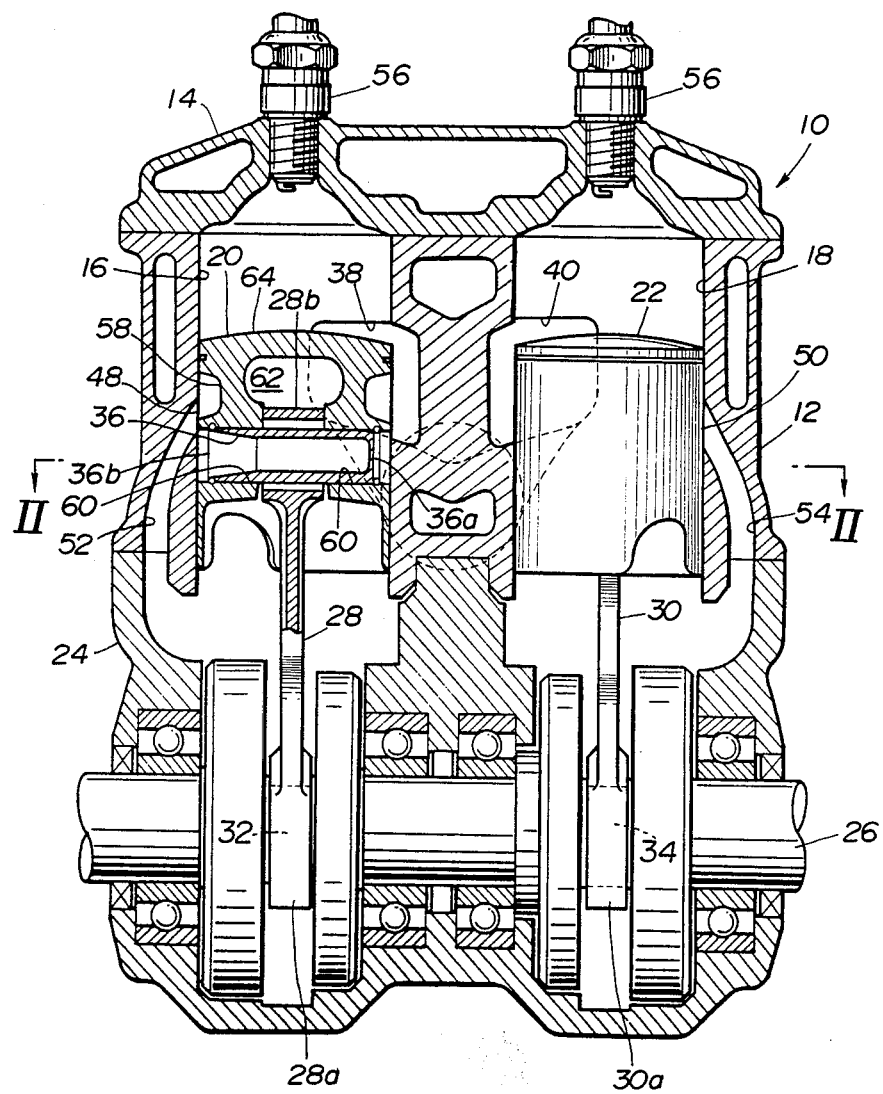
FIG. 1 is a cross-sectional view of a two-cycle engine provided in accordance with the present invention.

The invention will now be described with reference to the accompanying drawings in which like reference numerals denote corresponding parts in several views.

Figure 2:
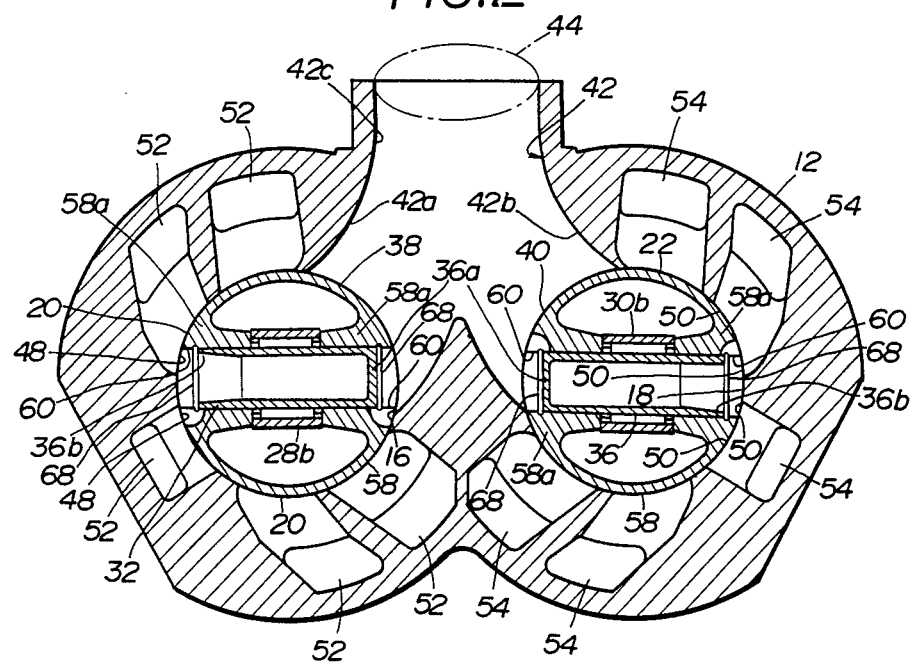
FIG. 2 is a cross-sectional view taken along the line II—II of FIG. 1.

A two-cycle engine 10 shown in FIGS. 1 and 2 comprises a cylinder block 12 having a cylinder head 14 thereon, the block 12 having a pair of juxtaposed first and second cylinders 16 and 18. A pair of first and second pistons 20 and 22 are received respectively in the first and second cylinders 16 and 18 for reciprocal movement therealong. A crankcase 24 is mounted on the block 12. The cylinder block 12 and the crankcase 24 jointly provide an engine body. The first and second pistons 20 and 22 are connected to a crankshaft 26 via respective connecting rods 28 and 30, the crankshaft 26 being rotatably mounted on the crankcase 24. One ends 28a and 30a of the connecting rods 28 and 30 are rotatably fitted on first and second crank pins 32 and 34, respectively, the crank pins 32 and 34 being displaced 180° from each other with respect to the crankshaft 26. The other end 28b, 30b of each of the connecting rods 28 and 30 is connected to a respective one of the pistons 20 and 22 by a wrist pin 36 as will hereinafter be more fully described, the wrist pin 36 being disposed perpendicular to the axis of the cylinder 16, 18.

A pair of first and second exhaust ports 38 and 40 are formed in the walls of the first and second cylinders 16 and 18, respectively. As best shown in FIG. 2, an exhaust manifold 42 is formed in the cylinder block 12 and has a pair of branch passages 42a and 42b communicating with the first and second exhaust ports 38 and 40, respectively, and a main passage 42c at which the two branch passages 42a and 42b are joined together. The main passage 42c is connected to an exhaust pipe 44 having an exhaust or expansion chamber therein.

A plurality of first scavenge ports 48 are formed in the wall of the first cylinder 16 while a plurality of second scavenge ports 50 are formed in the wall of the second cylinder 18. A plurality of first scavenge passages 52 extend through the walls of the crankcase 24 and cylinder block 12 to the respective first scavenge ports 48 to communicate the interior of the crankcase 24 with the interior of the first cylinder 16. Similarly, a plurality of second scavenge passages 54 extends through the walls of the crankcase 24 and cylinder block 12 to the second scavenge ports 50 to communicate the interior of the crankcase 24 with the interior of the second cylinder 18. As is well known, the exhaust ports 38 and 40 as well as the scavenge ports 48 and 50 are opened and closed by the outer peripheral surfaces of the respective pistons 20 and 22 moving along the respective cylinders 16 and 18. Reference numeral 56 designates spark plugs.

The power strokes of the first and second cylinders 16 and 18 begin alternately at each 180° of crankshaft rotation. In other words, as described above, the second crank pin 34 is displaced 180° from the first crank pin 32. Therefore, when one of the first and second pistons 20 and 22 is at its top dead center position, the other is at its bottom dead center position.

Blowby gas, tending to flow from each of the first and second cylinders 16 and 18 or combustion chambers through a respective one of the exhaust ports 38 and 40, is forced back into the combustion chamber by a reflected pressure wave of the exhaust gas produced by the provision of the expansion chamber in the exhaust pipe 44, thereby improving charging efficiency of the fuel-air mixture in the combustion chamber to achieve an increased power output. As is known, the reflected wave is composed of alternate positive pressure and negative pressure portions. Therefore, to achieve the improved charging efficiency, it is necessary that the positive pressure portion of the reflected wave should reach the exhaust port to efficiently force the blowby gas back to the combustion chamber during a time period between the closing of each scavenge port 48, 50 and the closing of each exhaust port 38, 40. A final portion of the duration of opening of one of the first and second exhaust ports 38 and 40 overlaps an initial portion of the duration of opening of the other. The positive pressure portion of the exhaust gas discharged from one of the first and second exhaust ports 38 and 40 at the initial portion of the duration of opening thereof is propagated toward the other via the adjacent branch passages 42a and 42b at the final portion of the duration of opening thereof, so that the pressure at the other exhaust port is rendered positive even in those ranges of the engine speed in which the positive pressure portion of the reflected wave is not to reach the other exhaust port.

The piston 20, 22 of a hollow construction has a peripheral wall 58 having a pair of diametrically opposite thickened portions 58a, and a pair of coaxial first and second holes 60 extending transversely through the thickened portions 58a, respectively, each of the holes 60 extending perpendicular to the axis of the cylinder and hence the axis of the piston. The diametrically-opposite outer ends of the pair of holes 60 open to the outer peripheral surface of the piston 20, 22. The hollow piston 20, 22 has an inner space 62 defined by the peripheral wall 58 and a top wall 64. The pair of coaxially-disposed holes 60 and that portion of the inner space 62 disposed between the pair of thickened portions 58a jointly provide a transverse bore for receiving the wrist pin 36.

The wrist pin 36 is tubular and has a closed end 36a and an open end 36b. The end 28b, 30b of the connecting rod 28, 30 is tubular. The opposite end portions of the wrist pin 36 are rotatably and closely fitted in the pair of coaxial holes 60, and the tubular end 28b, 30b of the connecting rod 28, 30 is rotatably fitted on that portion of the wrist pin 36 lying between the pair of holes 60. The opposite ends 36a and 36b of the wrist pin 36 terminate slightly short of the outer peripheral surface of the piston 20, 22. A pair of retaining rings 68 are mounted around the inner surfaces of the pair of coaxial holes 60, respectively, to prevent the wrist pin 36 from axial movement.

The scavenge ports 48, 50 are provided in the wall of the cylinder 16, 18 in circumferentially spaced relation so that the fuel-air mixture from the scavenge ports 48, 50 is directed toward the center or axis of the cylinder 16, 18. With this arrangement, the combustion gas in the cylinder can be efficiently expelled therefrom, and the flowing of the fuel-air mixture from the combustion chamber can be prevented as much as possible. The exhaust port 38, 40 and the scavenge ports 48 and 50 are so arranged that the diametrically-opposite outer ends of the pair of transverse holes 60 and hence the opposite ends 36a and 36b of the wrist pin 36 are brought into facing relation to the exhaust port and at least one (two in the illustrated embodiment) of scavenge ports, respectively, during the movement of the piston 20, 22 along the cylinder 16, 18. In other words, the opposite ends of the wrist pin 36 is brought into registry with the opposed exhaust and scavenge ports 38 and 48 (40 and 50) during the movement of the piston.

Since the one end 36a of the tubular wrist pin 36 is closed, the exhaust port 38, 40 is not brought into communication with the scavenge ports 48, 50, disposed in opposed relation to the exhaust port, via an axial bore of the hollow wrist pin 36 during the movement of the piston 20, 22 even when the opposite ends 36a and 36b of the wrist pin 36 are brought into facing relation to the opposed exhaust scavenge ports. Therefore, the disadvantages mentioned above are not encountered. Further, since the closed end 36a of the wrist pin 36 is so arranged as to be brought into facing relation to the exhaust port 38, 40, so that the exhaust gas will not flow into the axial bore or interior of the hollow tubular wrist pin 36, thereby preventing the reflected pressure wave in the exhaust chamber from being attenuated.

Figure 3:
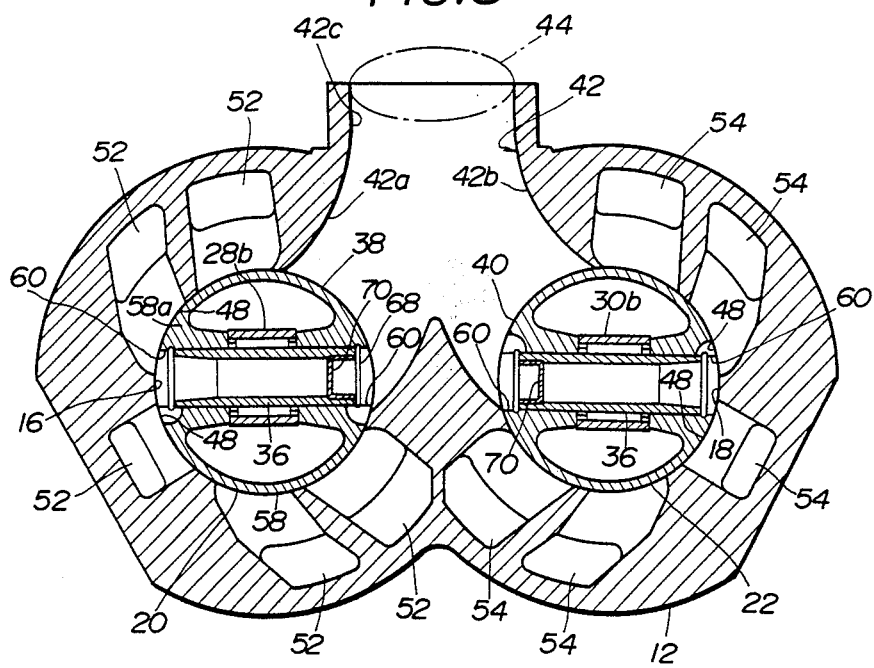
FIGS. 3 and 4 are views similar to FIG. 2 but showing modified engines, respectively.

A modified form of the invention shown in FIG. 3 differs from the preceding embodiment in that a hollow wrist pin 36 have opposite open ends and in that a separate plug 70 of a cup-shape is fitted in one of the open ends of the wrist pin 36 to close it, the plug 70 being brought into facing relation to the exhaust port 38, 40 during the movement of the piston 20, 22. With this construction, even when the opposite ends of the wrist pin 36 is brought into registry with the opposed exhaust and scavenge port during the movement of the piston, the opposed ports are not brought into communication with each other.

Figure 4:
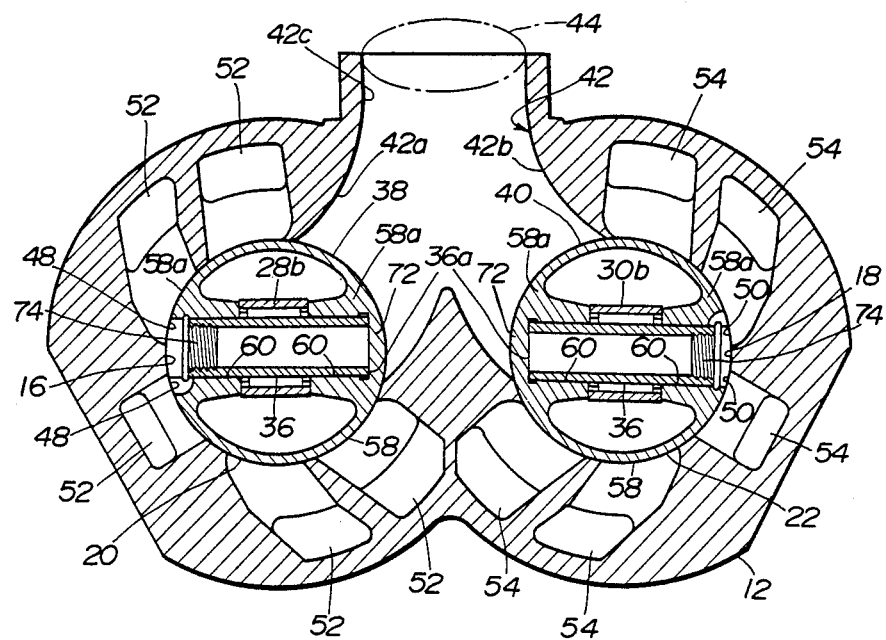

According to another modified form of the invention shown in FIG. 4, one of coaxial holes 60 close to the exhaust port 38, 40 terminates slightly short of the outer periphery of the piston 20, 22. Thus, the one hole 60 does not open to the outer peripheral surface of the piston 20, 22. A hollow wrist pin 36 fitted in the coaxial holes 60 has opposite open ends, and one end 36a thereof is held against a closure portion 72 of the thickened portion 58a, the outer surface of the closure portion 72 being part of the outer peripheral surface of the piston 20, 22. With this construction, even when the opposite ends of the wrist pin 36 is brought into registry with the opposed exhaust and scavenge port during the movement of the piston, the opposed ports are not brought into communication with each other. That portion of the piston 20, 22 which closes the exhaust port 38, 40 is subjected to elevated temperatures, so that the piston has an uneven temperature profile. However, the one hole 60 does not open to the peripheral surface of the piston, and therefore the area of contact of the piston with the cylinder is increased, thereby keeping the unevenness of the temperature profile as low as possible to prevent a distortion of the peripheral surface of the piston. Further, internal threads 74 are formed in a surface of the hollow wrist pin 36 adjacent to one end thereof remote from the exhaust port. This facilitates the attachment of the wrist pin 36 to the piston and the detachment thereof.

Figure 5:
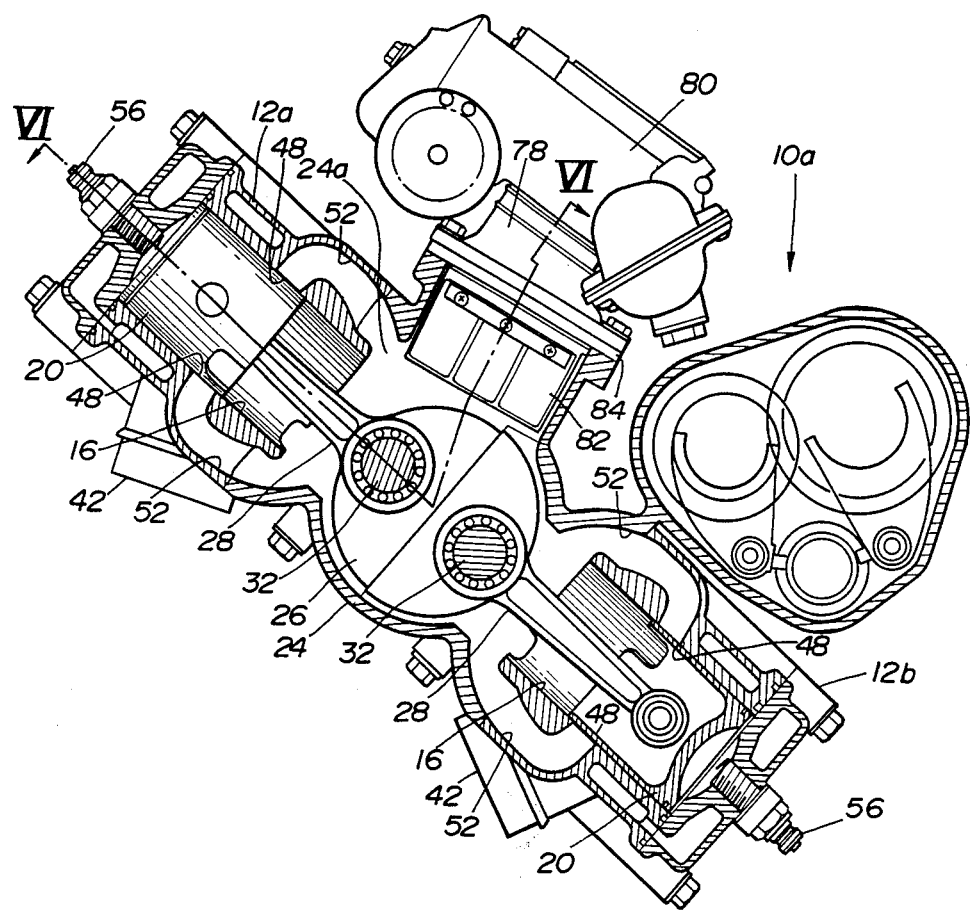
FIG. 5 is a cross-sectional view of a further modified engine.
Figure 6:
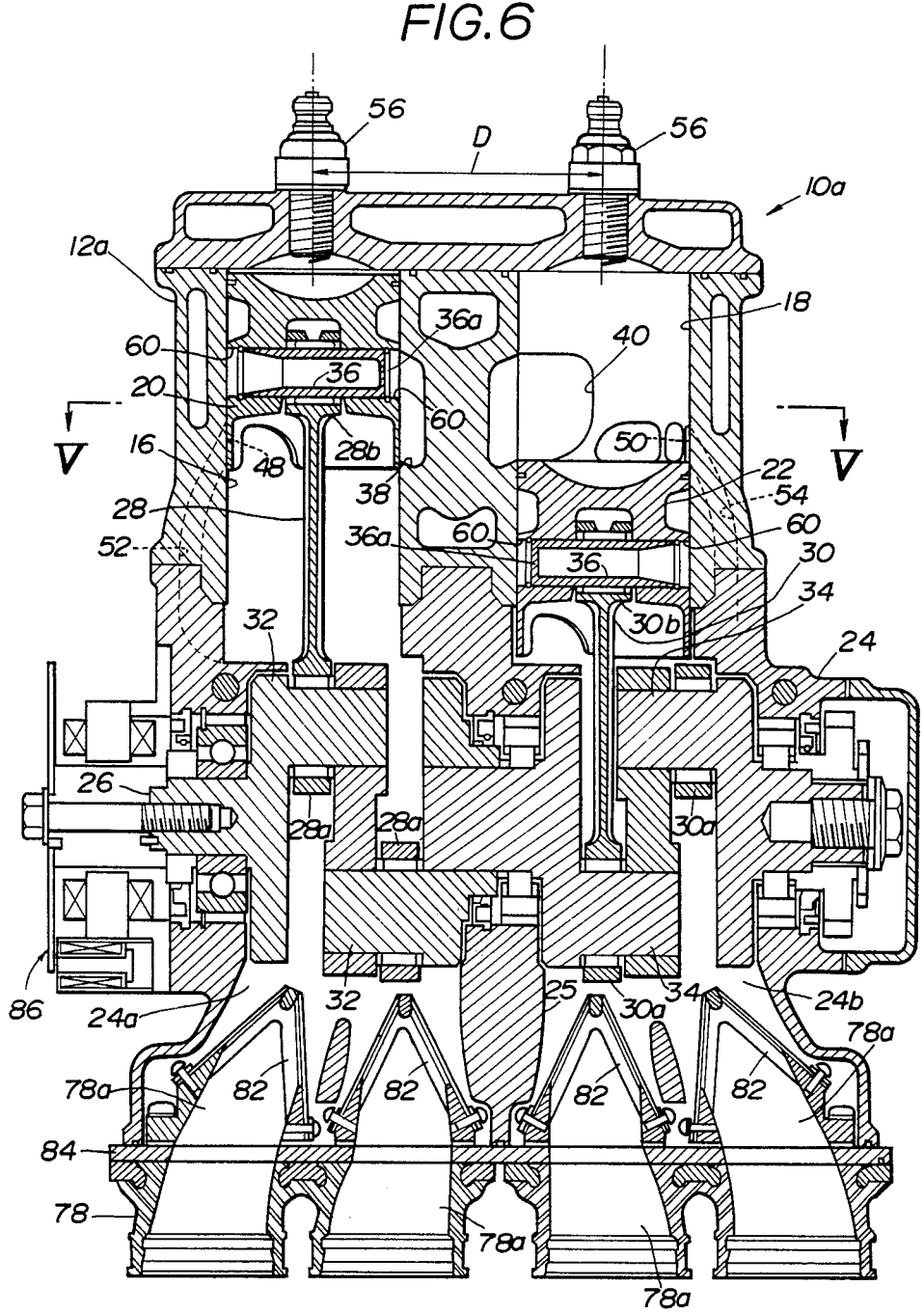
FIG. 6 is a cross-sectional view taken along the line VI—VI of FIG. 5.
Figure 7:
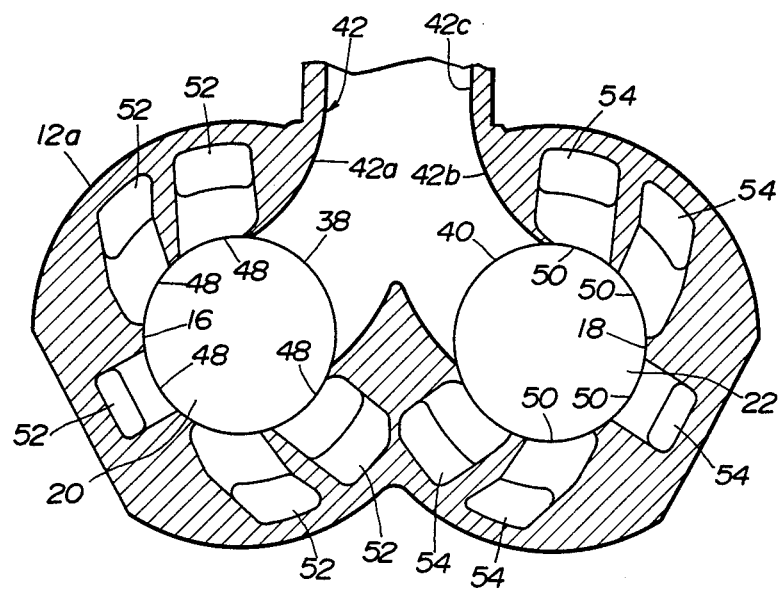
FIG. 7 is a cross-sectional view taken along the line VII—VII.
Figure 8:
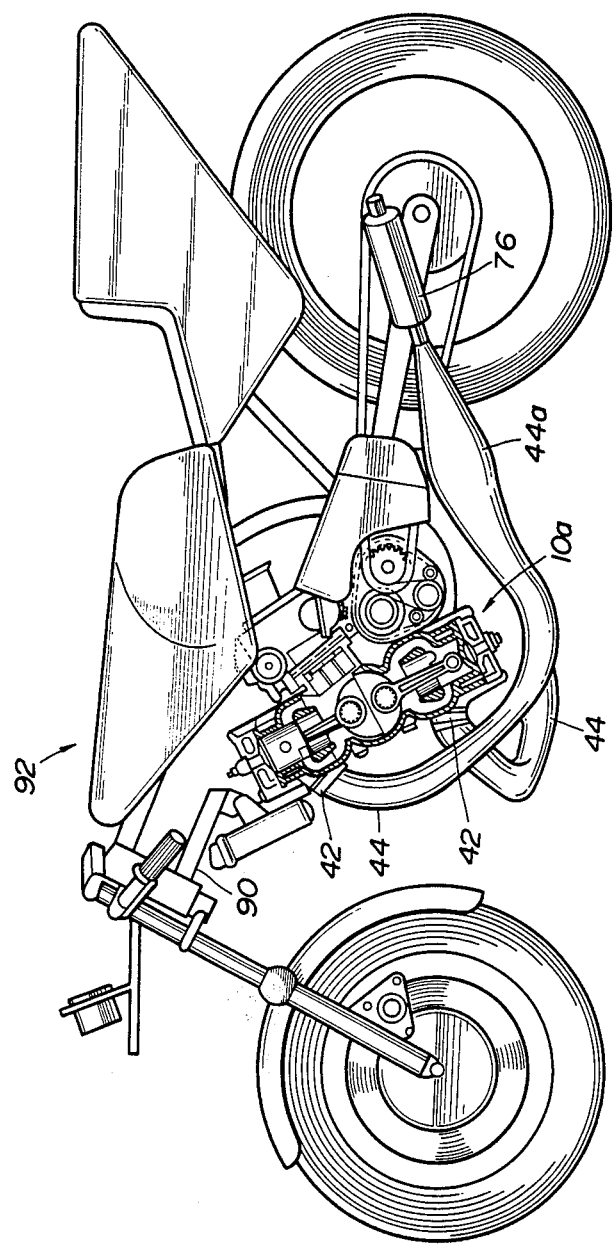
FIG. 8 is a side-elevational view of a motorcycle incorporating the engine of FIG. 5.

FIGS. 5 to 7 show a further modified two-cycle engine 10a which comprises a crankshaft 26 rotatably mounted on a crankcase 24 and a pair of first and second cylinder blocks 12a and 12b of a similar construction mounted on the crankcase 26 on opposite sides thereof. The interior of the crankcase 24 is divided into a pair of first and second crank chambers 24a and 24b by a partition plate 25. Each of the first and second cylinder blocks 12a and 12b is similar in construction to the cylinder block 12 of FIGS. 1 and 2, and has a pair of parallel juxtaposed cylinders 16 and 18. Thus, the cylinders 16 and 18 in the first cylinder block 12a correspond in number to the cylinders 16 and 18 in the second cylinder block 12b, and are disposed oppositely thereto, respectively. A pair of exhaust ports 38 and 40 are formed in walls of the juxtaposed cylinders 16 and 18, respectively. As described above for the engine 10 of FIGS. 1 and 2, an exhaust manifold 42 is formed in each of the cylinder blocks 12a and 12b. The main passage 42c is connected to an exhaust pipe 44 having an exhaust or expansion chamber 44a therein, and a silencer 76 is connected to a distal end of the exhaust pipe 44 (FIG. 8).

A plurality of scavenge passages 52 communicate the first crank chamber 24a with the cylinder 16 in the first cylinder block 12a via scavenge ports 48. Similarly, a plurality of scavenge passages 52 communicate the first crank chamber 24a with the cylinder 16 in the second cylinder block 12b via scavenge ports 48. Thus, the fuel-air mixture is supplied to the two cylinders 16 from the same crank chamber 24a. The axes of the two cylinders 16 in the first and second blocks 12a and 12b lie in a plane passing through the axis of the crankshaft 26. Similarly, the fuel-air mixture is supplied to the two cylinders 18 and 18 from the second crank chamber 24b through respective scavenge passages 54 and respective scavenge ports 50. And, the axes of the two cylinders 18 lie in the plane passing through the axis of the crankshaft 26. Therefore, the axes of the cylinders 16 and 18 and crankshaft 26 lie in a common plane.

A pair of pistons 20 are received respectively in the oppositely-disposed cylinders 16 for reciprocal movement therealong. One ends 28a of the connecting rods 28 are rotatably fitted on a pair of crank pins 32 respectively, the pair of crank pins 32 being displaced 180° from each other with respect to the crankshaft 26. The other end 28b of each of the connecting rods 28 is connected to a respective one of the pistons 20 by a wrist pin 36, as described above for the engine 10 of FIG. 1. Therefore, when one of the pistons 20 is at its top dead center position, the other is also at its top dead center position. Similarly, a pair of pistons 22 are received respectively in the oppositely-disposed cylinders 18 for reciprocal movement therealong. The pistons 22 are connected to the crankshaft 26 via respective connecting rods 30, and a pair of crank pins 34 which connect the pistons 22 to the respective connecting rods 30 are displaced 180° each other with respect to the crankshaft 26 as described above for the pistons 20.

Also, with respect to the juxtaposed cylinders 16 and 18 in each of the first and second blocks 12a and 12b, the crank pins 32 and 34 are displaced 180° from each other with respect to the crankshaft 26, so that the pistons 20 and 22 are reciprocable 180° out of phase. Therefore, when one of the pistons 20 and 22 is at its top dead center position, the other is at its bottom dead center position.

The arrangement of the juxtaposed cylinders 16 and 18 in each of the first and second blocks 12a and 12b, their exhaust ports 38 and 40 and scavenge ports 48 and 50 is similar to that described above for the engine 10 of FIGS. 1 and 2. Therefore, the diametrically-opposite outer ends of the pair of transverse coaxial holes 60 in each piston and hence the opposite ends of the hollow wrist pin 36 fitted therein are brought into facing relation to the exhaust port 38, 40 and scavenge ports 48, 50, respectively, during the movement of the piston along the mating cylinder.

An intake manifold 78 to which a carburetor 80 is connected is connected to the crankcase 24, and two pairs of intake passages 78a of the manifold 78 are communicable with the pair of crank chambers 24a and 24b, respectively, through reed valves 82. Since the reed valves 82 are mounted on a single mounting plate 84, a dead space resulting from the installation of the reed valves 82 can be reduced in size. When each piston 20, 22 is moved from its bottom to top dead center position to create a negative pressure in the crank chamber 24a, 24b, the reed valves 82 are opened to introduce the fuel-air mixture into the crank chamber. Also, when the piston is moved from its top to bottom dead center position to increase the pressure in the crank chamber, the reed valve 82 is closed to prevent a backflow of the fuel-air mixture into the intake manifold 78. Reference numeral 86 designates an alternator operatively associated with one end of the crankshaft 26.

As described above for the engine 10 of FIGS. 1 and 2, a final portion of the duration of opening of one of the exhaust ports 38 and 40 of the juxtaposed cylinders 16 and 18 in each of the blocks 12a and 12b overlaps an initial portion of the duration of opening of the other. The positive pressure portion of the exhaust gas discharged from one of the exhaust ports 38 and 40 at the initial portion of the duration of opening thereof is propagated toward the other via the adjacent branch passages 42a and 42b at the final portion of the duration of opening thereof, so that the pressure at the other exhaust port is rendered positive even in those ranges of the engine speed in which the positive pressure portion of the reflected wave is not to reach the other exhaust port.

As shown in FIG. 8, engine 10a is mounted on a frame 90 of a motorcycle 92 in inclined relation. The power strokes of the oppositely-disposed cylinders 16 begin at the same time, and the power strokes of the oppositely-disposed cylinders 18 begin at the same time. And, the power strokes of the cylinders 16a and the power strokes of the cylinders 18 begin alternately at each 180° of crankshaft rotation, thereby rotating the crankshaft 26.

As described above, the two cylinders 16 (18) are arranged on opposite sides of the crankshaft 26 and utilize the common crank chamber 24a (24b). In addition, the pitch D of the juxtaposed cylinders 16 and 18 in each of the blocks 12a and 12b is relatively small. Therefore, the width of the engine 10a, that is, the size in the direction of the length of the crankshaft 26, can be substantially reduced. Further, by virtue of the provision of the exhaust manifold 42, the number of the expansion chambers 44a and the silencers 76 can be half the number of the cylinders of the engine 10a. Therefore, the number of the component parts is reduced, which in turn reduces the manufacturing cost and the overall weight. In addition, a greater space is available for mounting the engine and other parts on the frame 84.

What is claimed is:

1. A two-cycle engine comprising:
   (a) an engine body having at least one cylinder, said cylinder having an exhaust port and at least one scavenge port disposed generally in opposed relation to said exhaust port;
   (b) a crankshaft rotatably mounted on said engine body;
   (c) a piston received in said cylinder for reciprocal movement therealong and having an outer peripheral surface for closing said exhaust and scavenge ports during the reciprocal movement thereof, said piston having a transverse bore extending therethrough with opposite ends of said transverse bore opening to the outer peripheral surface of said piston, and the opposite ends of said transverse bore being positioned so as to come into facing relation to said opposed exhaust and scavenge ports, respectively, during the reciprocal movement of said piston;
   (d) a hollow wrist pin received in said transverse bore and retained therein, one end of said wrist pin being closed and being positioned so as to come into facing relation with said exhaust port; and
   (e) a connecting rod connected between said crankshaft and said wrist pin for moving said piston along said cylinder upon rotation of said crankshaft.

2. A two-cycle engine according to claim 1, in which said closed end of said wrist pin is capable to being brought into facing relation to said exhaust port.

3. A two-cycle engine according to claim 1, in which said piston is of a hollow construction having a peripheral wall, said transverse bore including a pair of coaxial transverse holes extending through the peripheral wall of said piston, said wrist pin being fitted in said coaxial holes at opposite end portions thereof.

4. A two-cycle engine according to claim 1, in which a plug is fitted in said one end of said wrist pin to close it.

5. A two-cycle engine comprising:
   (a) an engine body having at least one cylinder, said cylinder having an exhaust port and at least one scavenge port disposed generally in opposed relation to said exhaust port;
   (b) a crankshaft rotatably mounted on said engine body;
   (c) a hollow piston received in said cylinder for reciprocal movement therealong and having an outer peripheral surface for closing said exhaust and scavenge ports during the reciprocal movement thereof, said piston having a peripheral wall and a pair of coaxial holes formed in the peripheral wall thereof, one of said coaxial holes extending through the peripheral wall of said piston and opening to the outer peripheral surface thereof at an outer end thereof, an outer end of the other coaxial hole terminating short of the peripheral surface of said piston, the outer end of said one hole and that portion of said peripheral wall closing the outer end of said other hole being capable of being brought into facing relation to said scavenge and exhaust ports, respectively, during the reciprocal movement of said piston;
   (d) a hollow wrist pin fitted in said pair of coaxial holes at their outer end portions and retained therein; and
   (e) a connecting rod connected between said crankshaft and said wrist pin for moving said piston along said cylinder upon rotation of said crankshaft.

6. A two-cycle engine according to claim 5, in which the outer end of said one coaxial hole is capable of being brought into facing relation to said scavenge port.

7. A two-cycle engine according to claim 6, in which internal threads are formed in a surface of said hollow wrist pin adjacent to one end thereof remote from said exhaust port.

8. A two-cycle engine according to claim 1, in which said engine body includes a crankcase and a pair of first and second cylinder blocks mounted on said crankcase on opposite sides thereof, said first cylinder block having a plurality of juxtaposed first cylinders while said second cylinder block has a plurality of juxtaposed second cylinders corresponding in number to said first cylinders and disposed in generally opposite relation to said first cylinders, respectively, each of said first and second cylinders having said opposed exhaust and scavenge ports, the interior of said crankcase being divided into a plurality of crank chambers, said scavenge ports of each pair of oppositely-disposed first and second cylinders communicating with a respective one of said crank chambers, said piston being received in each of said first and second cylinders for reciprocal movement therealong, said wrist pin being received in each of said pistons, said pistons received respectively in each adjacent ones of said first cylinders as well as said pistons received respectively in each adjacent ones of said second cylinders being reciprocable 180° out of phase, power strokes of each pair of oppositely-disposed first and second cylinders beginning simultaneously, each of said first and second cylinder blocks having a plurality of exhaust manifolds each having a pair of branch passages communicating respectively with said exhaust ports of each adjacent ones of said juxtaposed first and second cylinders and a main passage at which said pair of branch passages join together, a final portion of the duration of opening of one of said exhaust ports of each adjacent ones of said juxtaposed first and second cylinders overlapping an initial portion of the duration of opening of the other.

9. A two-cycle engine according to claim 8, in which axes of said first and second cylinders and an axis of said crankshaft lie in a common plane.

* * * * *